United States Patent
Cipin

Patent Number: 5,916,681
Date of Patent: Jun. 29, 1999

[54] INSULATING CONSTRUCTION MATERIAL COMPRISING GRANULAR INSULATING MATERIAL

[76] Inventor: Jozef Cipin, 75 Willowbank Blvd., Toronto, Canada, M5N 1G7

[21] Appl. No.: 08/872,553

[22] Filed: Jun. 10, 1997

[30] Foreign Application Priority Data

Jun. 13, 1996 [CA] Canada .................................. 2179110

[51] Int. Cl.⁶ .................................................. B32B 5/16
[52] U.S. Cl. ................ 428/403; 52/309.15; 52/404.1; 52/506.01; 428/218; 428/340; 428/341; 428/404; 428/407; 428/451
[58] Field of Search ................. 428/403, 407, 428/404, 451, 340, 341, 218; 52/309.15, 404.1, 506.01

[56] References Cited

U.S. PATENT DOCUMENTS

| | | | |
|---|---|---|---|
| Re. 31,421 | 10/1983 | Wehrmann et al. | 521/42 |
| 3,902,911 | 9/1975 | Messenger | 106/676 |
| 3,950,259 | 4/1976 | Pallo et al. | 252/62 |
| 4,134,242 | 1/1979 | Musz et al. | 52/309.1 |
| 4,199,484 | 4/1980 | Murphey | 523/424 |
| 4,238,242 | 12/1980 | Park | 523/204 |
| 4,391,873 | 7/1983 | Brassell et al. | 442/349 |
| 5,254,385 | 10/1993 | Hazlett | 428/76 |
| 5,529,624 | 6/1996 | Riegler | 106/675 |

FOREIGN PATENT DOCUMENTS

| | | |
|---|---|---|
| 0 340 707 A2 | 8/1989 | European Pat. Off. . |
| 27 10 402 A1 | 10/1977 | Germany . |

*Primary Examiner*—Hoa T. Le
*Attorney, Agent, or Firm*—Riches, McKenzie & Herbert

[57] ABSTRACT

A particulate insulating material is disclosed which includes a sound absorptive central core having a density of at least 1.0 grams/cm³, and an outer less dense thermally insulating coating provided at least partially about the core. The outer coating is selected to provide thermally insulating properties and may have either an open or closed foamed or expanded cellular structure and a density of less than 0.75 grams/cm³, with the core comprising between about 5 to 80% of the granule by volume. The high density core is chosen from a material which absorbs, reflects and/or diffracts sound waves, such as metals as well as natural and synthetic solid compositions and compounds.

20 Claims, 4 Drawing Sheets

INSULATING CONSTRUCTION MATERIAL COMPRISING GRANULAR INSULATING MATERIAL

SCOPE OF THE INVENTION

The present invention relates to an insulating material which may be used either as loose material or as part of a panel construction, and more particularly to a granular or chip-type insulating material having a sound absorbing and sound isolating high density central core, and a relatively less dense thermally insulating outer coating.

BACKGROUND OF THE INVENTION

Granular-type insulating materials used in providing thermal insulation are well known. Typically, conventional granular insulating materials consist of expanded or foamed light-weight polymers, such as polystyrene. The polymers are formed into approximately spherical granules which have an average diameter of about 1.5 millimeters.

It is known to use conventional polystyrene granules in construction where, for example, the granules are used as thermal insulation which is blown loose into attics or cavities, or are compacted together to form aggregate panels which range in thickness between 0.5 and 6 inches. While expanded polystyrene has low thermal conductivity and provides good thermal insulation, the low density of polystyrene makes conventional granules very poorly suited to absorb sound energy and substantially transparent to sound energy.

In another construction use, polystyrene granules are admixed with cement to produce a light-weight concrete slurry. In addition to producing set concrete having enhanced thermal resistance, the lighter weight of the concrete mixture advantageously facilitates vertical pumping, as for example, is required in the erection of high-rise buildings. A disadvantage in using conventional polystyrene granules in concrete slurries exists, however, in that the granules have an overall density less than about half of that of water and which typically ranges from about 0.2 to 0.5 grams/cm$^3$. As a result of their low density, the polystyrene granules tend to float in the slurry resulting in their uneven distribution in the set concrete.

A further disadvantage with conventional polystyrene insulating granules exists in that if the granules are exposed to a flame, the polystyrene will readily burn, producing noxious fumes and potentially hazardous bi-products on combustion.

Conventional granular insulating materials also suffer the disadvantage that they are highly susceptible to damage by rodents and insects. In particular, mice and rats may easily burrow through and nest in either loose blown granules or aggregate panels made from such granules.

SUMMARY OF THE INVENTION

To overcome at least some of the disadvantages associated with the prior art, the present invention provides for an insulating particulate material which may be used in construction and which has a sound absorbing and/or sound isolating high density core which is surrounded by a relatively less dense thermally insulating outer coating. The insulating outer coating advantageously prevents thermal conduction, while the higher density core absorbs, reflects and/or refracts sound waves to reduce the propagation of sound waves through the granules.

Another object of the invention is to provide a thermally insulating granule having a sound absorbing high density core which may be easily and economically manufactured.

Another object of the invention is to provide an acoustical panel for use as a construction material which is formed from a plurality of thermally insulating granules having a high density core which incorporates rodent and/or insect deterring compounds or compositions.

A further object of the invention is to provide an insulating granule for use as a construction material and which may safely incorporate flame retardant compounds and/or compositions without concern of degradation of such compounds over prolonged periods of time.

Another object of the invention is to provide a lightweight concrete mixture incorporating a number of insulating granules having an average density roughly equal to or greater than that of water, and more preferably ranging between 0.8 to 1.5 grams/cm$^3$, and which may be either cast or poured to form a rigid slab having improved distribution of granules.

A further object of the invention is to provide insulating granules which have an overall specific gravity approximately equal to that of light concrete, and which when added to a light concrete slurry will not tend to float and/or sink in the slurry.

The applicant has appreciated that at least some of the foregoing objects may be achieved by providing an insulating granule which includes a sound absorptive central core which has a density of at least 1.0 grams/cm$^3$, and an outer less dense thermally insulating coating provided at least partially about the core. The outer coating preferably has an expanded cellular structure and a density of less than 0.75 grams/cm$^3$, with the core comprising between about 5 to 80% of the granule by volume, and more preferably about 10 to 40% by volume.

The granules may be either generally spherical or have an amorphous shape and have an average diameter of between about 0.5 to 30 mm. More preferably, the outer coating is provided evenly about the core with the ratio of average cross-sectional diameter of the core to that of the overall granule diameter being selected at between about 5:6 and 1:6, and more preferably between about 1:2 to 1:4.

The high density core may be chosen from any number of materials which absorb, reflect and/or diffract sound waves, including metals as well as natural and synthetic solid compositions and compounds. Particularly suited materials may, for example, include recycled waste material and metal scrap. Where the insulating granules are to be admixed with concrete, as for example, as in light cement used for high-rise construction, higher density core materials such as molybdenum, iron, zinc, or barium sulphate may be used to provide the granules with an overall density between about 0.8 to 1.5 grams/cm$^3$. In other uses, however, silica sand or gravel may advantageously be used as a core material as it is readily available, inexpensive and may be found existing with the preferred core diameter range of between about 0.1 and 25 mm.

The outer coating is selected to provide thermally insulating properties and may have either an open or closed foamed or expanded cellular structure. The outer coating preferably consists of Styrofoam™ or other expanded polystyrene. The polystyrene may be applied either as a continuous layer directly to the core material or as an aggregate coating of expanded polystyrene particles, or unexpanded polystyrene particles which are thereafter expanded by steam contact. The polystyrene foam forms an insulating layer having a thickness of between about 0.5 to 30 mm and preferably about 1 to 5 mm. While polystyrene is readily available and provides a cost effective thermal barrier, other low density materials are also possible, including foamed or expanded plastics and polyurethanes, polyvinyl acetate, polyvinyl chloride, synthetic and natural rubbers, polypropylenes, polyethylenes, styrenated polyesters and styrenated resins.

More preferably, one or more compounds which act as a flame retardant, an insecticide and/or a rodenticide are also provided within the outer coating. Fire retardants, insecticides and/or rodenticides may form part or all of the core itself, or may be provided as an initial or pre-coating which is provided directly about the core prior to the application of the outer coating. Where polystyrene particles are used, the retardant/insecticide/rodenticide compound may be provided as part of an adhesive coating applied to the core and which is used to adhere the unexpanded polystyrene particles to the core during and following the expansion of the particles.

Where a pre-coating is applied to the core to provide enhanced anti-pest or fire resistant properties, the thermally insulating outer coating is preferably formed having a substantially closed cell structure. In this manner, the outer coating completely encloses any fire retardant coating, rodenticide or insecticide, sealing it from the atmosphere. The applicant has appreciated that sealing the fire retardant, insecticide, or rodenticide from the atmosphere both reduces the potential for the granules to give off any potentially hazardous or noxious fumes, and also permits the use of atmospherically unstable compounds or pre-coatings without concern of their breakdown to ineffective compounds by prolonged exposure to the air.

The sound dampening insulation of the present invention has numerous possible uses, including in thermal and acoustical panels in railway cars, busses, trailers and mobile homes, as well as for use in office dividers and temporary partitions, as sound insulation for dish washers and refrigerators, in doors for general use as well as outside access and garage doors, in prefabricated construction panels, as additives in self levelling light concrete, and as infill material in buildings and houses to fill cavities in partitions, crawl spaces, walls and floors.

Accordingly, in one aspect the present invention resides in a construction material comprising, a plurality of insulating granules, each of said granules having an average diameter of between about 0.5 and 30 mm and including, a central core having a first density of at least 1.0 grams/cm$^3$, and a thermally insulating outer coating disposed at least in part about said core, the outer coating having a second density of less than 0.75 grams/cm$^3$, and wherein the core comprises between about 5 to 75% of the granule by volume.

In another aspect, the present invention resides in an insulation granule including, a central core comprising silica sand, and a thermally insulating outer coating disposed about said central core, the outer coating having an expanded closed cell structure and a density which is less than about 0.8 grams/cm$^3$, the outer coating being selected from the group consisting of polystyrene, polyethylene, polyvinyl, polyvinyl chloride and rubber, and wherein the core comprises between about 10 to 50% of the granule by volume.

BRIEF DESCRIPTION OF THE DRAWINGS

Further objects and advantages of the invention will appear from the following description taken together with the accompanying drawings in which.

DETAILED DESCRIPTION OF THE DRAWINGS

Figure 1:
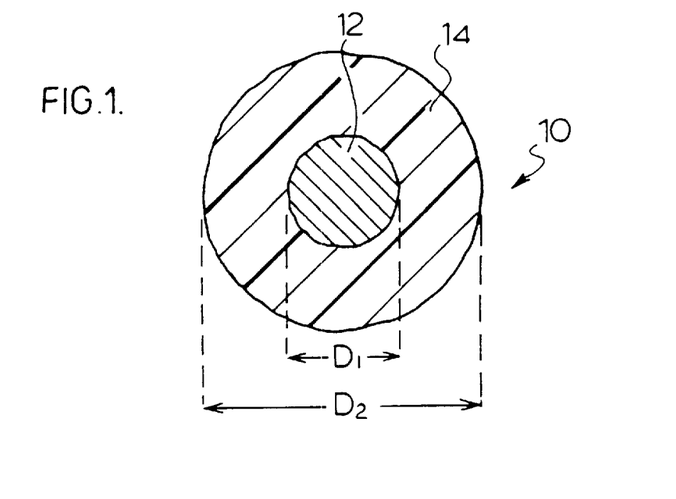
FIG. 1 is a cross-sectional view of an insulating granule in accordance with a preferred embodiment of the invention.

Reference is first made to FIG. 1 which shows an insulating granule 10 in accordance with a first embodiment of the invention. The granule 10 consists of an inner core 12 and an outer coating 14 which is disposed approximately evenly about the core 12. FIG. 1 shows the granule 10 as being generally spherical in cross-section for clarity, however, it is to be appreciated that typically, the granule 10 will have a more amorphous overall shape.

In FIG. 1, the core 12 consists of a single grain of silica sand and has an approximate density of about 2.6 grams/cm$^3$. The density of the silica core 12 advantageously acts to either reflect, diffract or absorb sound waves which contact the core material. Silica sand is a highly preferred material for use in the present invention as, in addition to being readily available and comparatively inexpensive, silica sand may easily be found existing having the preferred average core diameter size of between about 0.5 and 2 mm. From a manufacturing perspective, silica sand may therefore be used to form the core 12 by selective screening, and without having to first crush or pre-size the sand material.

The outer coating 14 comprises an expanded closed cell polystyrene such as Styrofoam™, which completely surrounds and encases the core 12. The outer coating extends about the core 12 having a layer thickness of between about 0.5 mm and 4 mm and an average density of less than 0.6 grams/cm$^3$, and more preferably less than 0.4 grams/cm$^3$. It is to be appreciated that the closed cell structure polystyrene coating 14 is thermally nonconductive, making the granules 10 ideally suitable for use as thermal insulation in a number of construction applications.

The granule 10 is thus provided having an average exterior diameter of up to about 10 mm, and preferably between about 1 and 4 mm, with the core 12 comprising between about 5% and 80% of the granule 10 by volume, and more preferably between about 10% to 40%. The outer coating 14 is applied over the core 12 such that the ratio of the average core diameter $D_1$ to the overall average granule diameter $D_2$ is selected at between about 1:2 to 1:4, and more preferably at about 1:3. The granules 10 have a range of uses, including as loose blown "chip-type" insulation, as part of an aggregate use to form panel boards and/or as additives in concretes, plasters, rubbers or the like.

The applicant has appreciated that in use, the plurality of granules 10 either as a loose insulating material or compressed together as a sheet, form an effective thermal and sound barrier. When a plurality of granules 10 are provided in proximity, the higher density core 12 in each granule 10 locates a short distance from cores 12 of the immediately adjacent granules 10. For example, when an array of granules 10 is provided with a number of granules 10 positioned so that the peripheral surfaces of the respective outer coatings 14 are in contact, the corresponding higher density cores 12 will be separated relative to one another by a distance of between about 1 mm and 4 mm.

By providing the granule with a higher density core, the overall mass of the granule 10 is increased, providing enhanced acoustical isolating and absorption properties.

While silica sand is disclosed as a preferred material for use in the present invention, it is to be appreciated that larger pebble sized cores are also possible. In addition, the core 12 could equally be formed from any number of materials which have a sufficient density to reflect or absorb sound waves. Preferably, the compounds or compositions used provide the core 12 with an average density of at least 2 grams/cm$^3$. Table 1 provides a non-limiting listing of possible materials suitable for use in forming the core 12.

TABLE 1

| Material | Density (gms/cm$^3$) |
| --- | --- |
| Tungsten and alloys | 13.4–19.6 |
| Molybdenum and alloys | 10.0–13.7 |
| Lead and alloys | 10.7–11.3 |
| Copper alloys | 7.5–9.0 |
| Iron | 7.9 |
| Barium Sulphate | 5.0–6.0 |
| Zinc and alloys | 5.2–7.2 |
| Magnesia, MgO | 3.5 |
| Common rocks | 2.2–3.0 |
| Silica glass, SiO$_2$ (quartz) | 2.6 |
| Soda glass | 2.5 |

Similarly, while expanded cellular polystyrene may be a preferable coating, it is to be appreciated that other low density materials may also be used for the thermally insulating outer coating 14. Thermally insulating materials suitable for use as the coating 14 include foamed and expanded open or closed cell polystyrenes, polyethylenes, polyurethanes, polyvinyl acetate, polyvinyl chloride, rubbers, styrene-butadiene rubbers, styrenated polyesters and styrenated resins to name just a few.

Figure 2:
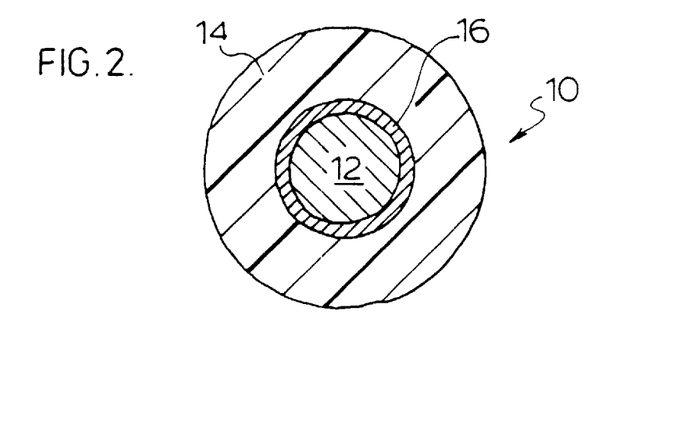
FIG. 2 is a cross-section view of an insulating granule in accordance with a second embodiment of the invention.

FIG. 2 shows a granule 10 in accordance with a second embodiment of the invention in which like reference numerals are used to identify like components. The granule 10 of FIG. 2 includes a core 12 and outer coating 14 identical to that of FIG. 1. An inner or pre-coating 16 is also provided applied directly to the core 12. The inner coating 16 may, for example, comprise one or more of an insecticide, a rodenticide or a fire retardant composition. In this manner, the granule 10 may be provided with rodent or insect repelling properties and/or enhanced flame retardant capabilities.

The outer coating 14 is provided about the pre-coating 16 in a closed cell configuration which substantially isolates the pre-coating 16 from the atmosphere. It is to be appreciated that the use of a closed cell outer coating 14 permits insecticides, rodenticides and/or flame retardants to be used which are otherwise unstable when in prolonged contact with atmospheric gases. As well, the use of a closed cell coating 14 advantageously acts to trap large organic molecule gases, effectively sealing the pre-coating 16, and preventing the release of potentially noxious chemicals and fumes which may be hazardous to human or animal health.

When an insecticide is provided as part or all of the pre-coating 16 and insects, such as carpenter ants or termites, attempt to burrow through the granules 10, they expose the insecticide containing pre-coating 16 on the granule core 12. The present invention is advantageous in that only minute amounts of insecticide are released at the precise location of infestation, minimizing the potential for health risks to humans when the insulating granules 10 are provided as part of building walls and foundations. Similar advantages are also to be achieved where a rodenticide is provided as part of the pre-coating 16.

A number of various insecticides or rodenticides may be used to form part of the pre-coating 16, including organic based compounds, borax, boric acid, or other organochemical compounds. Organic based insecticides could, for example, include those sold commercially under the names Diazinon™ and Malathion™.

The presence of a closed cell coating 14 is similarly advantageous when a fire retardant is provided as part or all of the inner pre-coating 16. Flame retardants which may be used in the present invention include aluminum hydrate, bromides and/or borax hydrate which on combustion of the polystyrene coating 14 release water or other compounds to extinguish flames.

It is to be appreciated that although FIG. 2 shows the granule 10 as including a pre-coating 16, solid insecticides, rodenticides and/or the flame retardants may also be used in place of silica sand to form part or all of the high density core 12 itself.

Figure 3:
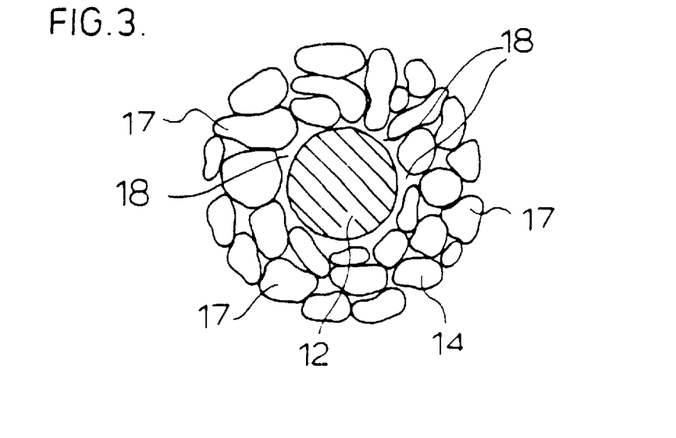
FIG. 3 is a cross-sectional view of an insulating granule in accordance with a third embodiment of the invention.

FIG. 3 shows a third embodiment of the granule 10 in accordance with the present invention and wherein like reference numerals are used to identify like components. The granule 10 of FIG. 3 includes a core 12 similar to the embodiments shown in FIGS. 1 and 2. The outer insulating coating 14 is not formed as a uniform layer, but rather consists of an aggregate of expanded polystyrene particles 17 which envelope the core 12. The polystyrene particles 17 which form the aggregate are maintained in place surrounding the core 12 by an adhesive matrix 18.

Figure 4:
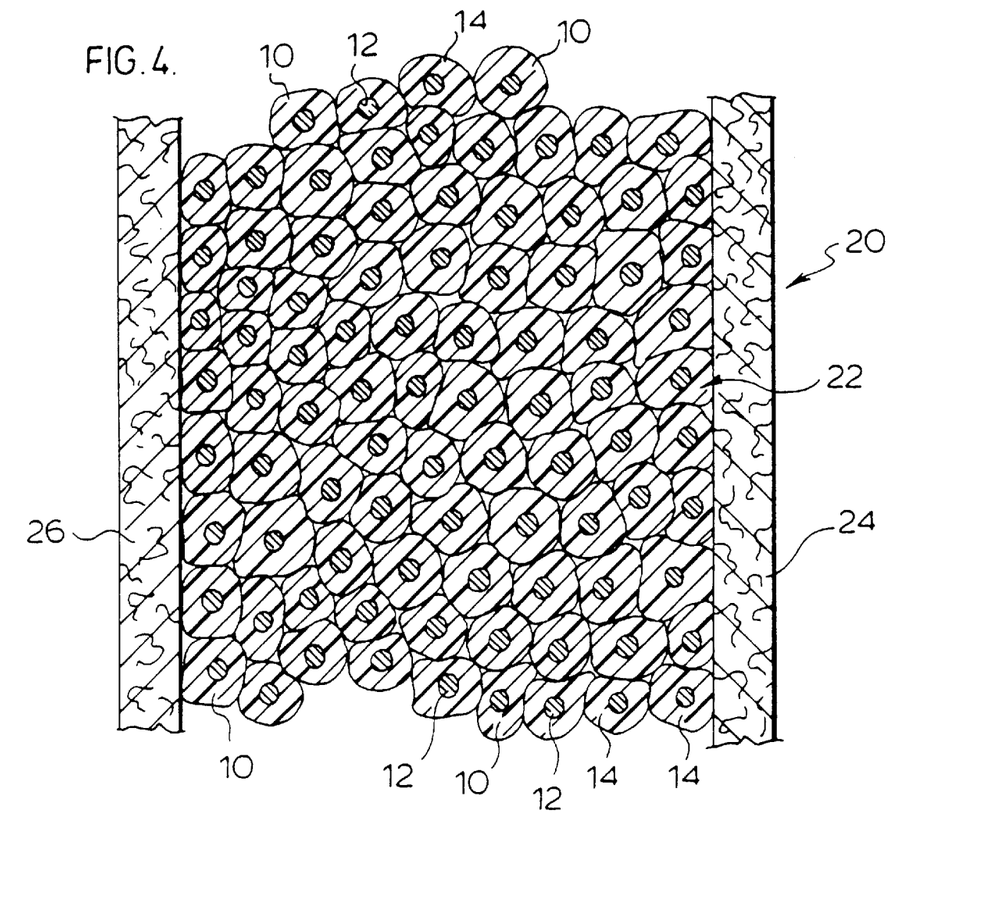
FIG. 4 is a cross-sectional view of an acoustical panel incorporating a plurality of the insulating granules shown in FIG. 1.

In manufacture of the granule 10 shown in FIG. 3, the core material is coated with a liquid adhesive composition used to form the matrix 18. Immediately following coating by the adhesive 18, the core 12 and adhesive 18 construct is then powdered with unexpanded polystyrene particles. Preferably, the unexpanded polystyrene particles range in average diameter of between about 0.1 mm and 0.5 mm. To form a panel having a predetermined shape as shown in FIG. 4, following powdering, the core 12 with its unexpanded coating is placed into a mould and exposed to a dry steam environment, resulting in the expansion of the polystyrene particles. Alternately, to form individual granules for use as loose insulation or in concrete, following powdering, the core and unexpanded coating are immersed in boiling water or placed in a wet steam environment to expand the polystyrene.

The individual polystyrene particles 17 preferably are expanded to an averaged meter of between about 0.25 mm and 2 mm. The applicant has appreciated that as the polystyrene expands, the matrix 18 retains the majority of the particles as an aggregate 17 about the core 12. This has been found to advantageously prevent the core material from settling towards the bottom portion of the mould cavity. Granules 10 having smaller sized cores 12 are formed in essentially the same manner. Where the granules 10 are used to fill larger mould cavities, additional loose unexpanded polystyrene material may optionally be added as intro-granular filler material prior to exposure to the steam environment.

If desired, a flame retardant and/or insecticide and/or rodenticide may be incorporated into the adhesive matrix 18 so as to function in the same manner as the pre-coating 16. Alternately, the pre-coating 16 of FIG. 2 could be applied to the core 12 prior to the application of the matrix 18 and particles 17.

The insulating granules 10 shown in FIGS. 1 to 3 may advantageously be used either alone or as part of other materials used in construction. For example, the insulating granules 10 may be provided either alone or mixed with conventional cellulose as loose thermal insulation which is blown into attics, crawl spaces or between walls.

Alternately, the granules 10 may be fused together to form rigid polystyrene-type panels for thermal and sound insulation. FIG. 4 shows a partial enlarged cross-sectional view of an acoustical panel 20. The panel 20 consists of a number of insulating granules 10 which are compressed together and heated to form an aggregate core sheet 22, in a similar manner to that used in the manufacture of existing expanded polystyrene board or bead board. During heating, the outer surface of the low density coatings 14 of the granules 10 partially melt and deform, bonding granules 10 to each other.

Although not essential, the panel 20 is also provided with a front and back layers of 1 to 2 mm cardboard or other sheet material 24,26 which are glued to each side of the aggregate core 22. In addition to providing the panel 20 with an enhanced aesthetic appearance and increased structural rigidity, the covering layers 24,26 minimize granule drop, whereby individual granules 10 break loose from the outer surfaces of the aggregate core 22. The panel 20 provides good thermal insulating properties as well as acoustically insulating and absorptive properties.

While FIG. 4 illustrates a panel 20 in which the granules 10 are formed into an aggregate core 22 by partially melting the outer coating 14 of each granule 10, the granules 10 could also be formed into a panel having a looser structural arrangement by the use of glues or other such binders used to adhere the various granules 10 together. Binders used in panel construction could possibly include additives for enhanced fire preventative properties and/or rodenticide and insecticidal compounds, or even acoustically absorptive materials.

Figure 5:
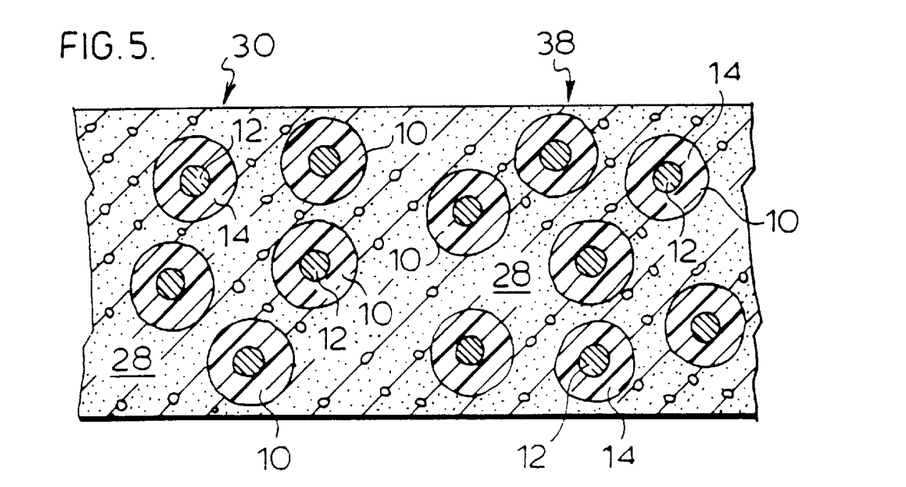
FIG. 5 is a cross-sectional view of a cast concrete slab incorporating a plurality of the insulating granules shown in FIG. 1.

FIG. 5 shows the granules 10 as used in a construction material in accordance with a further embodiment of the invention. In FIG. 5, a number of granules 10 are provided together with a cement matrix 28 to form a cement slurry 30. The cement matrix 28 consists of light weight cement which, when wet, has an approximate average density of between about 1.4 and 2.5 grams/cm$^3$.

In the slurry 30 of FIG. 5, the granules 10 have a core 12 size and material selected to provide the granule with an overall density of between about 0.8 and 1.5 grams/cm$^3$. Preferably, the granules 10 are provided in the slurry 30 in a ratio with the concrete matrix at a ratio of between about 1:1 to 1:20 by volume, and more preferably between about 1:4 and 1:8 by volume.

The inclusion of the granules 10 lowers the overall density of the cement slurry 30 making it easier to pump the wet slurry 30 under pressure through hoses. The cement slurry 30 may therefore be advantageously used as a construction material in the manufacture of high-rise buildings and other structures where the pumping of cement is required. As well, when the slurry 30 hardens to a set concrete slab, the granules 10 advantageously provide both enhanced thermal and sound insulation within the set concrete.

When light cement is provided as the matrix 28, the granules 10 advantageously have a reduced tendency to float or sink in the cement matrix 28, as a result of their density approaching that of the wet matrix 28. The granules 10 therefore tend to remain statically in suspension within the slurry 30 resulting in their more even dispersion throughout the resulting concrete slab.

While the preferred embodiments disclose the use of the granules 10 as part of aggregate panels 20 and concrete slurry 30 mixtures, other uses are also possible and will now become apparent. The loose insulating granules 10 could, for example, be used for hydroponics or as loose insulation to limit evaporation on water reservoirs and the like. In particular, by forming the granules 10 so that each has an overall density of about 0.8 grams per cc, the granules 10 may be floated on the surface of the reservoir as a covering medium, without concern that the granules 10 will be carried off by wind.

Figure 6:
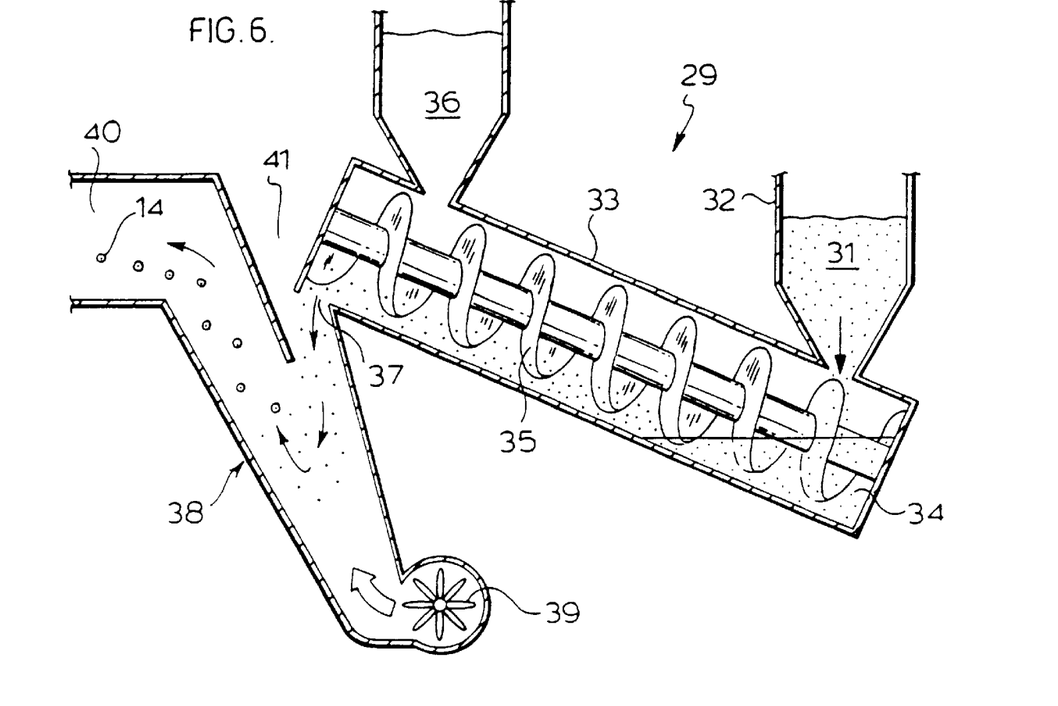
FIG. 6 schematically illustrates a preferred apparatus for use in the manufacture of the insulating granules of FIG. 3.

FIG. 6 shows one possible apparatus 29 for use in the manufacture of the granules 10 shown in FIG. 3. The apparatus includes a hopper 32 which opens downwardly into an inclined cylindrical mixing chamber 33. The hopper 32 supplies pebbles 31 used to form the core 12 of the completed granules 10 into an adhesive bath 34 at the lowermost end of the chamber 33 where they are coated with the adhesive composition used to form the matrix 18. A helical auger 35 is rotatably mounted within the chamber 33 driven in rotation by a motor (not shown). The rotation of the auger 35 moves the pebbles 31 from the bath 34 and beneath hopper 36. Unexpanded polystyrene particles are fed from the hopper 36 into the cylindrical chamber 33. The rotation of the auger 35 in the chamber 33 ensures the even application of the unexpanded polystyrene particles. It is to be understood that the configuration of the auger 35 and its flights may be modified to increase or decrease the residence time of the core material in the chamber 33, depending on the setting time of the adhesive composition and the degree of mixing described. Preferably, the coated particles are maintained in the chamber 33 until such time as the adhesive sets, fully bonding the polystyrene particles to the core 12.

Following the coating with the unexpanded polystyrene particles, the coated pebbles are moved via the auger 35 through a discharge opening 37 into a steam sorting chamber 38. The coated pebbles entering the sorting chamber 38 fall under gravity towards a blower 39 which blows a steam/hot air mixture towards a discharge outlet 40. The chamber 38 is formed so that it narrows towards its bottom and the blower 39, with the result that air flow intensity increases towards the bottom of the chamber 38 and decreases towards the top opening 40.

As the coated pebbles approach the bottom of the chamber 38 the air flow from the blower 39 maintains them in suspension. Simultaneously, the steam in the chamber 38 causes the polystyrene particles to expand to product the thermally insulating coating 14. With the expansion of the polystyrene coating, the surface area of the granule 10 increases whereby the granule 10 is carried by air current outwardly from the chamber 38 via the outlet 40.

If desired, a by-pass outlet 41 may also be provided adjacent the discharge opening 37. The by-pass outlet is positioned so that any pebbles which remain uncoated following passage from the chamber 33 are carried by the air flow therein to recovery hopper (not shown) for re-use.

Figure 7:
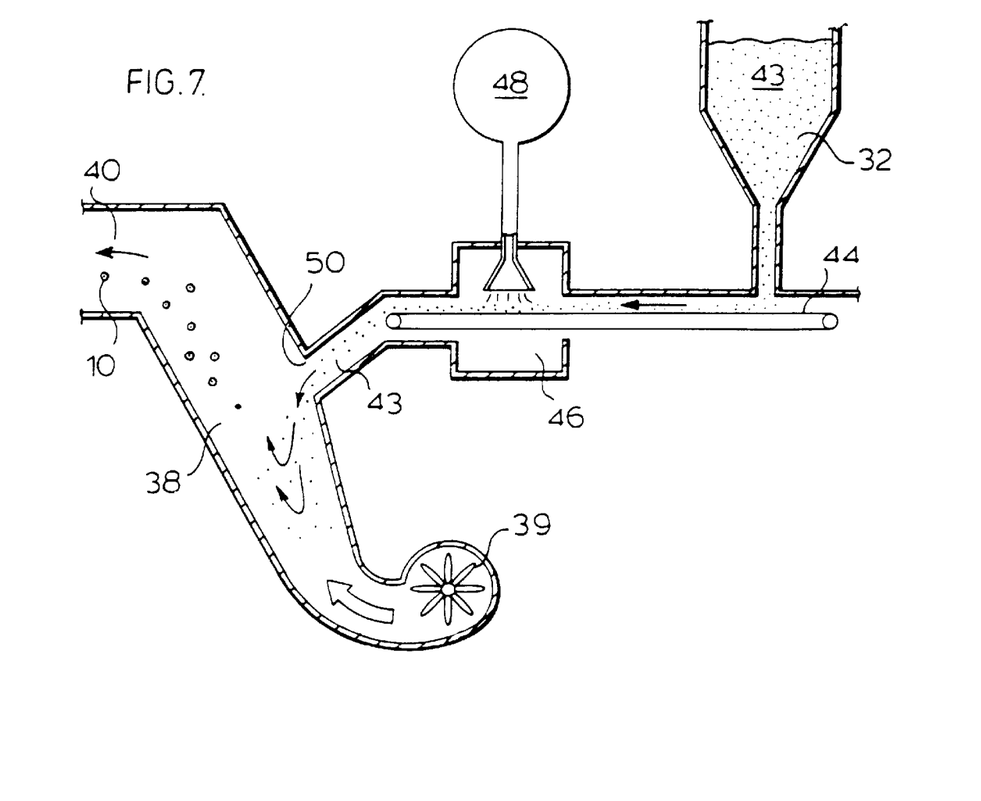
FIG. 7 schematically illustrates an alternate apparatus used for the manufacture of the insulating granules of FIG. 1.

FIG. 7 shows a second possible apparatus 42 used in the manufacture of granules 10 shown in FIG. 1. The apparatus 42 contains similar operational elements to that shown in FIG. 6 with like reference numerals identifying like components. In the apparatus 42 as shown, silica sand 43 which has been pre-sized by screening to remove sand grains which are either larger or smaller than the desired core size is fed into a hopper 32.

From the hopper 32, the sand 43 is slowly fed onto a vibrating conveyor 44, with the vibrations evenly dispersing the sand grains 43 across the surface of the conveyor 44. The conveyor 44 next moves the dispersed sand grains 43 through a spray chamber 46 where a foamable liquid resin is sprayed from a liquid reservoir 48 onto the sand grains 40. The use of a vibrating conveyor 44 advantageously ensures that during the spray coating process in the chamber 46, each sand grain 43 is evenly coated with the liquid resin.

The thickness of the coating 14 to be achieved may be easily controlled by shortening or lengthening the residence time of the sand grains 43 in the spray chamber 46, whereby a longer residence time in the chamber 46 produces a granule 10 having a thicker outer coating 14. The expandable thermally insulating resin used to coat the sand grains 43 is selected containing dissolved gases. It is to be appreciated that the precise gas content of the resin will vary depending on whether an open or closed cell coating 14 is to be provided about the core 12 of the formed granule 10.

Once coated with the liquid resin, the sand grains 43 are moved through an inlet 50 by the conveyor 44 into a steam/hot air sorting chamber 38 which is provided with a top opening 40. Hot air or steam is blown upwardly and outwardly through the top opening 40 via a steam/hot air blower 39 positioned at the bottom of a chamber 38.

In the same manner as described with reference to FIG. 6, the coated sand grains 43 entering the chamber 38 tend to fall under gravity towards the blower 39. As the sand grains 43 approach the bottom of the chamber 38, the increasing intensity of the air flow entrains the sand grains 40, maintaining them in suspension. While entrained, steam and warm air from the air blower 39 causes the simultaneous curing of the expandable resin while the gases dissolved in the resin expand to produce the expanded cellular coating 14 about the sand grain 43, which functions as the granule core 12.

The coated sand grains/granule cores 12 remain entrained by the upward gas flow until the resin coating 14 expands to a sufficient degree whereby, as a result of its increased surface area, the gas flow carries the cured granule 10 upwardly through the upper opening 40.

Following their movement through the opening 40, the granules 10 are collected for later use as loose insulation, or for incorporation into other construction materials such as used in acoustical panels. When used in panels, the granules 10 could be fused together by heating to partially melt and fuse the foamed insulating layers together. Alternately, the panels could be formed using a binder to secure the granules together, such as elastomeric binders as, for example, neoprene.

While FIGS. 1 to 3 show generally spherical granules 10 in which a low density coating 14 is provided about the entire exterior surface of a core 12, the invention is not so limited and other shapes will now become apparent.

Figure 8:
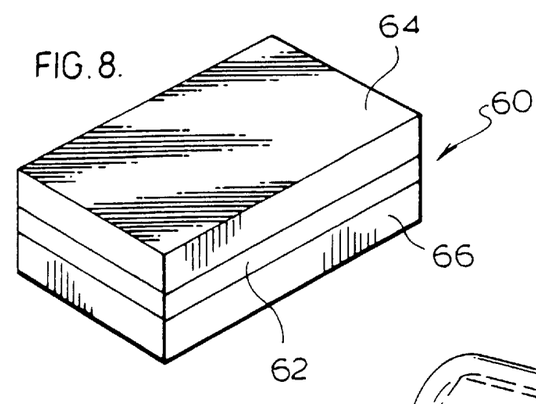
FIG. 8 shows a perspective view of an insulating chip material in accordance with a fourth embodiment of the invention.
Figure 9:
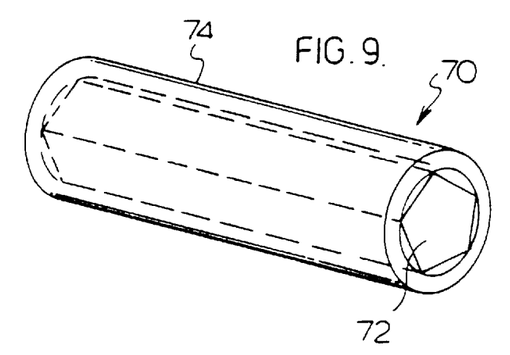
FIG. 9 shows schematically an insulating chip material in accordance with a fifth embodiment of the invention.

FIGS. 6 and 9 show two possible chip-type insulating material construction. The insulating chip 60 of FIG. 8 is characterized by a generally rectangular construction in which a flattened high density core 62 is sandwiched between two layers 64,66 of low density thermally insulating material. The core 62 may be secured to the layers 64,66 by adhesive. The chip 60 advantageously permits simplified construction as a laminate which is formed in large sheets and then cut into squares or rectangles ranging in length up to 3 cm.

The chip 70 of FIG. 9 has a cylindrical construction in which a cylindrical high density core 72 is positioned within a hollow sleeve 74 of thermally insulating material. The chip 70 may advantageously be formed as a single coextrusion which is then cut into lengths of up to 3 cm.

Preferred materials for use as the high density cores 62,72 would include rubbers such as from recycled tires, as well as heavy metal such as lead and barium sulphate, with or without binders and additives to function as flame retardants, insecticides and rodenticides. In addition to expanded polystyrene, suitable materials for use as the thermally insulating layers would include PV foam, PE foam, foam rubber, cork, and mixtures thereof.

Figure 10:
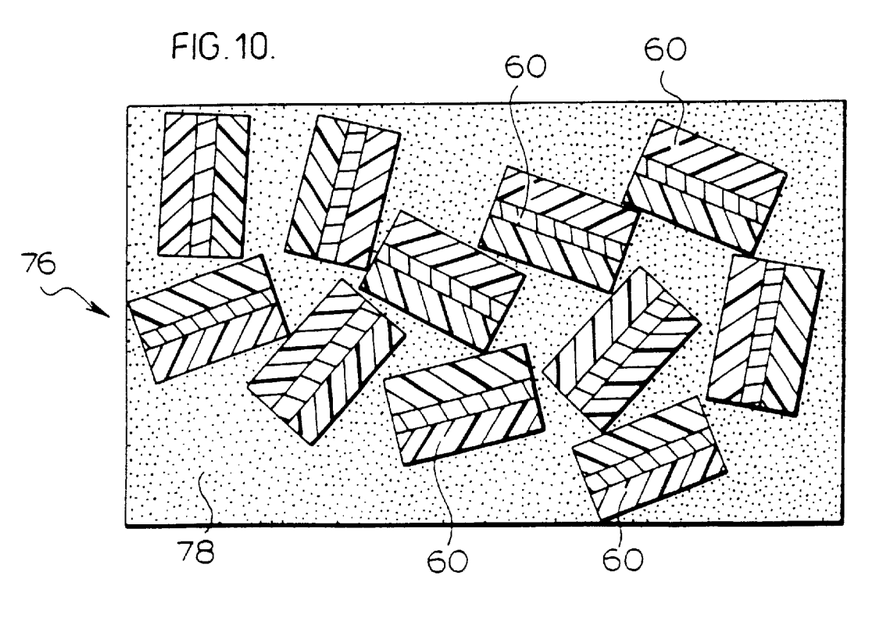
FIG. 10 shows a part cross-sectional view of a panel incorporating a plurality of insulating chips shown in FIG. 8.

FIG. 10 shows the chip-type material of FIG. 8 used to form part of a prefabricated panel 76 in which the individual chips 60 are secured within a binder 78 such as neoprene or silicone. It is to be appreciated, however, that the chips 60,70 are equally suitable for use as a loose insulation material.

Although the detailed description describes and illustrates preferred embodiments, the invention is not so limited. Modifications and variations will now become apparent to a person skilled in this art. For a definition of the invention, reference may be had to the appended claims.

I claim:

1. A construction material comprising,
    a plurality of insulating granules, each of said granules having an average diameter of between about 0.5 and 30 mm and including,
    a central core having a first density of at least 1.0 grams/cm$^3$, and
    a thermally insulating outer coating disposed at least in part about said core, the outer coating having a second density of less than 0.75 grams/cm$^3$, and
    wherein the core comprises between about 5 to 75% of the granule by volume.

2. A construction material as claimed in claim 1 wherein said core of each said granule is enclosed within said outer coating, and the core comprises between about 10 to 40% of the granule by volume.

3. A construction material as claimed in claim 2 wherein the central core is selected from the group consisting of silica sand and gravel.

4. A construction material as claimed in claim 3 wherein said coating comprises an expanded cellular polystyrene.

5. A construction material as claimed in claim 4 further comprising repellant means for repelling pests selected from the group consisting of insects and rodents substantially enclosed within said coating.

6. A construction material as claimed in claim 4 wherein said granules are bound to each other to form an aggregate panel.

7. A construction material as claimed in claim 2 wherein said coating is selected from the group consisting of polystyrene, polyethylene, polyurethane, polypropylene, polyvinyl acetate, polyvinyl chloride, rubber, styrene-butadiene rubber, styrenated polyesters and styrenated resins.

8. A construction material as claimed in claim 2 wherein said granules further include a flame retardant enclosed within said outer coating.

9. A construction material as claimed in claim 8 wherein said flame retardant is selected from the group consisting of aluminum hydrate, borax hydrate and bromides.

10. A construction material as claimed in claim 8 wherein said core comprises barium sulphate.

11. A construction material as claimed in claim 2 wherein said granules further comprise an insecticide enclosed within said coating.

12. A construction material as claimed in claim 2 wherein said granules further comprise a rodenticide enclosed within said coating.

13. A construction material as claimed in claim 2 including a matrix surrounding said granules, said matrix comprising light concrete.

14. A construction material as claimed in claim 13 wherein the relative densities of said core and said coating are selected so that each of said granules has an overall density of between about 0.8 to 1.5 grams/cm$^3$.

15. A construction material as claimed in claim 14 wherein said granules and said concrete matrix are provided in a ratio of between about 1:1 to 1:20 by volume.

16. An insulation material including,
   a plurality of insulating particles selected from the group consisting of granules and chips, said particles characterized by an inner core having a density of at least 1 gm/cm$^3$, and a thermally insulating outer coating disposed about said core, the outer coating having an expanded closed cell structure and a density which is less than about 0.6 grams/cm$^3$, the outer coating being selected from the group consisting of polystyrene, polyethylene, polypropylene, polyvinyl acetate, polyvinyl chloride and rubber, and wherein the core comprises between about 10 to 50% of the particle by volume.

17. An insulating material as claimed in claim 16 wherein said particles have an overall density of between about 0.5 and 2.0 gms/cm$^3$.

18. An insulating material as claimed in claim 17 wherein said particles further include a flame retardant at least partially enclosed within said outer coating.

19. An insulating material as claimed in claim 18, wherein said particles further include an insecticide at least partially enclosed within said outer coating.

20. An insulating material as claimed in claim 16 wherein said particles further include a rodenticide at least partially enclosed within said outer coating.

* * * * *